United States Patent [19]
Russell

[11] 3,983,373
[45] Sept. 28, 1976

[54] ARTICLE CONTROL SYSTEM
[75] Inventor: David S. Russell, Lakewood, Colo.
[73] Assignee: Columbine Glass Company, Inc., Wheatridge, Colo.
[22] Filed: Apr. 30, 1975
[21] Appl. No.: 572,977

[52] U.S. Cl. ............................. 235/151.3; 214/6 P; 235/92 PK
[51] Int. Cl.² .................... G05B 11/00; B65G 57/00
[58] Field of Search .......... 235/151.1, 151.3, 92 PK, 235/98; 444/1; 214/6 P

[56] References Cited
UNITED STATES PATENTS

| | | | |
|---|---|---|---|
| 3,050,199 | 8/1962 | McGrath et al. | 214/6 P |
| 3,586,176 | 6/1971 | Rackman et al. | 214/6 P |
| 3,624,782 | 11/1971 | McPeek et al. | 214/6 P |
| 3,688,920 | 9/1972 | Frish | 235/98 R X |
| 3,705,410 | 12/1972 | Kooy et al. | 444/1 |
| 3,789,194 | 1/1974 | Kirby | 235/92 PK |

*Primary Examiner*—Edward J. Wise
*Attorney, Agent, or Firm*—Thomas W. O'Rourke

[57] ABSTRACT

An article control system is disclosed that is particularly useful in connection with a palletizer and the like wherein a plurality of articles such as boxes or cases are to be arranged in a predetermined manner and orientation. The system provides electrical signals for automatic control over the functions of a machine connected with the system to effect a desired end such as arranging a plurality of boxes in side-by-side relationship for stacking purposes. Opto-isolating circuitry is utilized in conjunction with logic circuitry to enhance system reliability and counter and memory units are utilized to program the article arrangement to be achieved. In addition, manual reset circuitry is provided to reset the system as needed.

20 Claims, 3 Drawing Figures

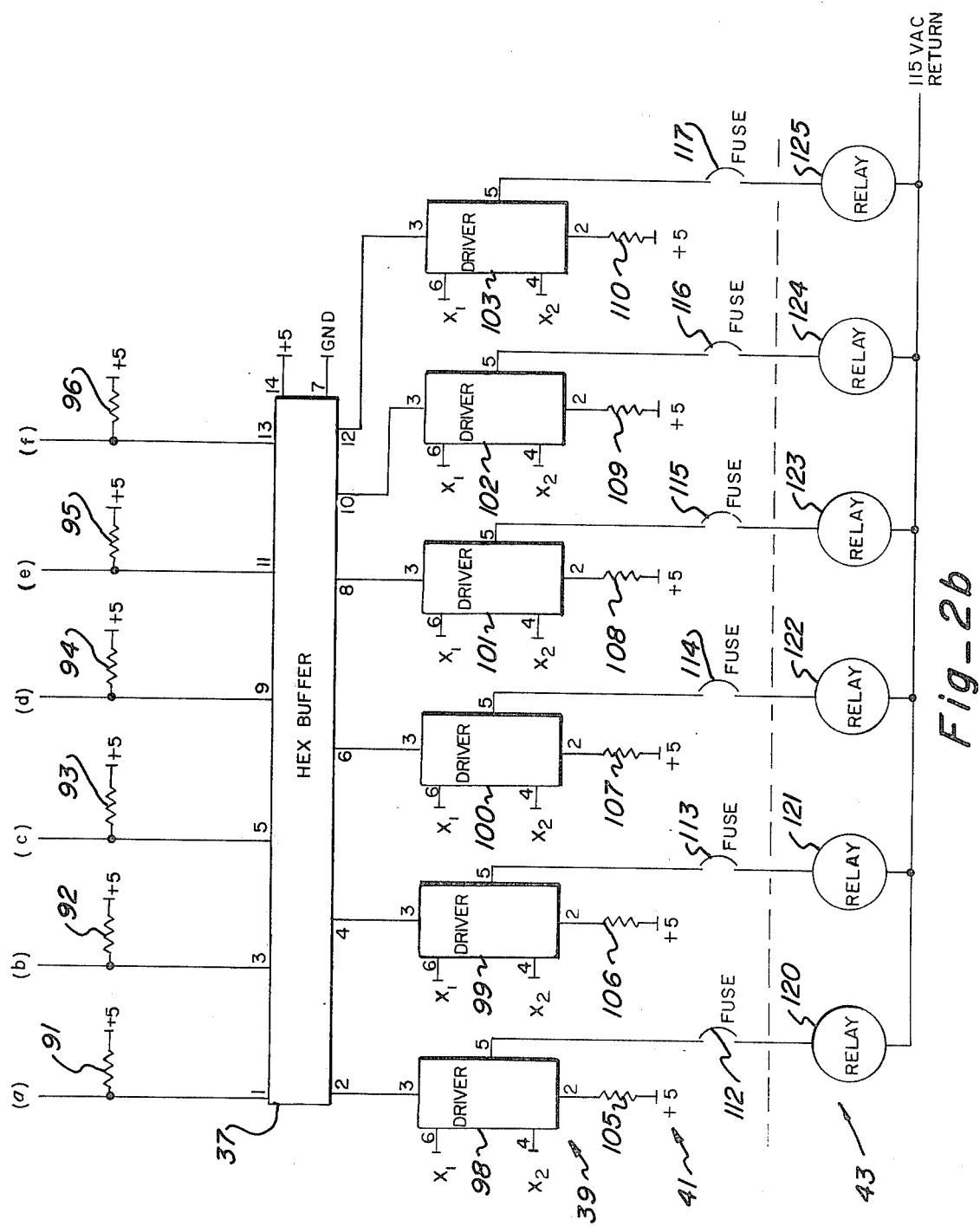
Fig_2b

ARTICLE CONTROL SYSTEM

FIELD OF THE INVENTION

This invention relates to an article control system and, more particularly, relates to a control system for a palletizer to effect a predetermined article arrangement.

BACKGROUND OF THE INVENTION

It is oftentimes desirable to automatically control a machine to effect a systemized and often sequential series of acts. Such is the case, for example, where a palletizer is utilized to arrange a plurality of boxes in a predetermined manner such as in a contiguous side-by-side relationship with the boxes in a predetermined orientation with respect to one another. As each box is conveyed from a packing or assembly station to the palletizer, the boxes must be directed into the proper predetermined position, normally by conventional arms which engage the box to direct and/or turn the same as needed.

While various systems have been heretofore suggested and/or utilized for article orientation, and while various palletizing systems have been suggested and/or utilized for article positioning, improvements to such systems are always desirable.

By way of example, an apparatus for handling cases is shown in U.S. Pat. No. 3,050,199, issued Aug. 21, 1962, to E. J. McGrath et al.

SUMMARY OF THIS INVENTION

This invention provides an improved article control system that is particularly useful with a palletizer. In addition, the system of this invention provides opto-isolation and logic circuitry to enhance system reliability, as well as a counting and memory circuit to program the desired end.

It is therefore an object of this invention to provide an improved article control system.

It is another object of this invention to provide an improved article control system for a palletizer.

It is yet another object of this invention to provide an improved article control system providing isolation to enhance system reliability.

It is still another object of this invention to provide an improved control system having opto-isolation and logic circuitry.

It is yet another object of this invention to provide an improved control system having programming means for preselection of control.

It is still another object of this invention to provide an improved control system having manual reset.

With these and other objects in view which will become apparent to one skilled in the art as the description proceeds, this invention resides in the novel combination and arrangement of parts as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

Th following drawings illustrate the best mode of the invention so far appreciated and illustrate the principles of said invention, and in which.

DESCRIPTION OF THE INVENTION

Figure 1:
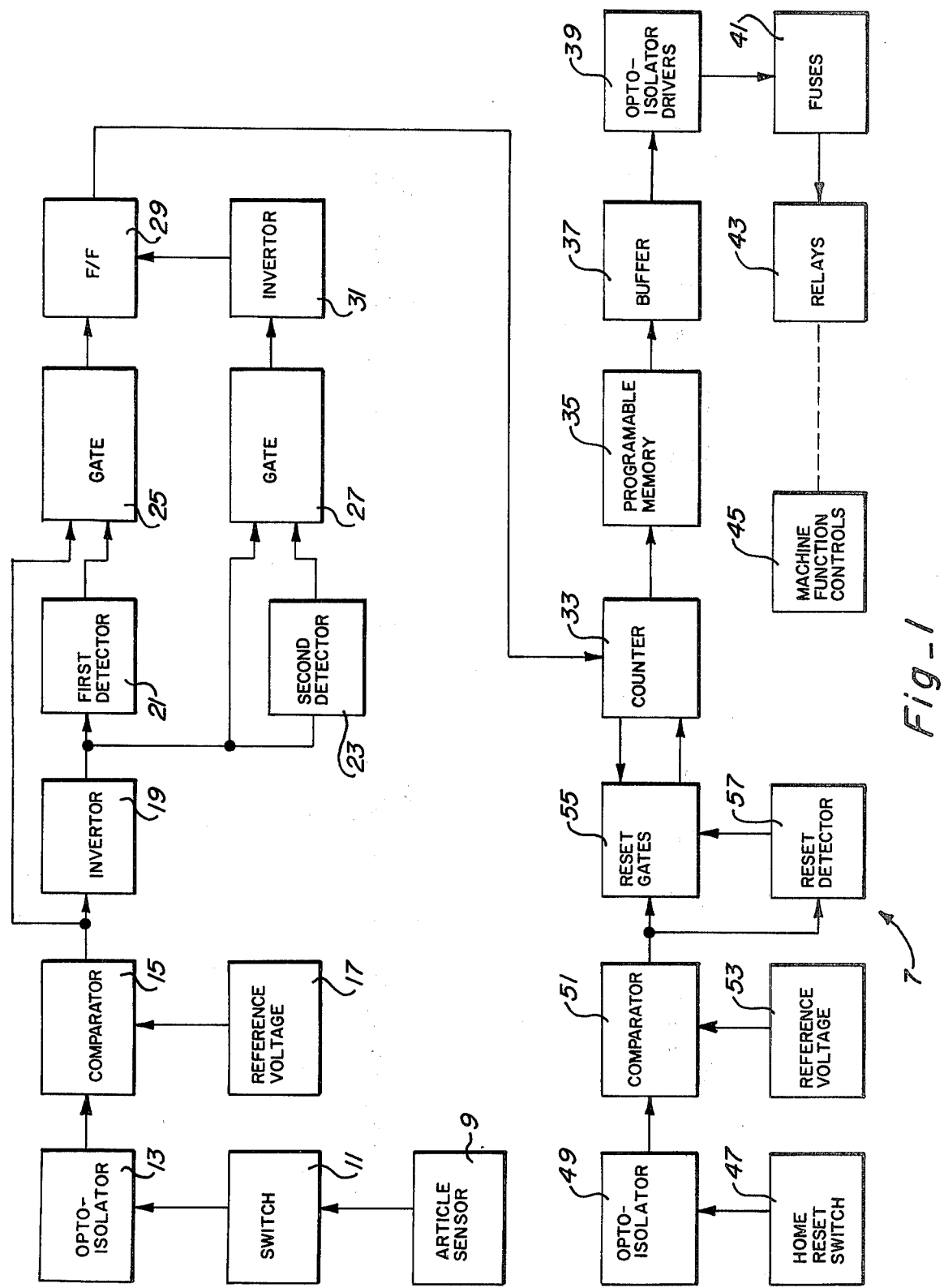
FIG. 1 is a block diagram of the control system of this invention.

Referring now to the drawings, the numeral 7 indicates generally the control system of this invention. As indicated in FIG. 1, an article sensor 9 senses the presence of an article such as a box (not shown). Article sensor 9 may be any conventional detector, such as a switch, photoelectric cell, relay or the like.

The output of article sensor 9 is coupled through switch 11 to an opto-isolator 13, the output from which a coupled to comparator 15. As is conventional, comparator 15 receives a second input from reference voltage source 17 and when the threshold is exceeded, supplies an output that is coupled through inverter 19 to first and second detectors 21 and 23.

The output from first detector 21 is coupled to gate 25 as is the output from comparator 15, while the output from second detector 23 is coupled to gate 27 as is the output from inverter 19. The output from gate 25 is coupled to flip-flop 29, and the output from gate 27 is coupled through inverter 31 to flip-flop 29.

The output from flip-flop 29 is coupled to counter 33, the output from which is coupled to programable memory 35. Memory 35, which is preferably a read only memory, provides outputs through buffer 37 to opto-isolating drivers 39 which, in turn, provides outputs through fuses 41 to the relays 43 controlling machine function controls 45.

Manual reset is provided by home reset switch 47 connected through opto-isolator 49 to comparator 51. Comparator 51 receives a second input from reference voltage source 53 and provides an output to reset gates 55 which also receives an input from reset detector 57 connected with comparator 51. An output from reset gates 55 is coupled to counter 33 to reset the same and an output from the counter is also coupled back to reset gates 55.

Figure 2A:
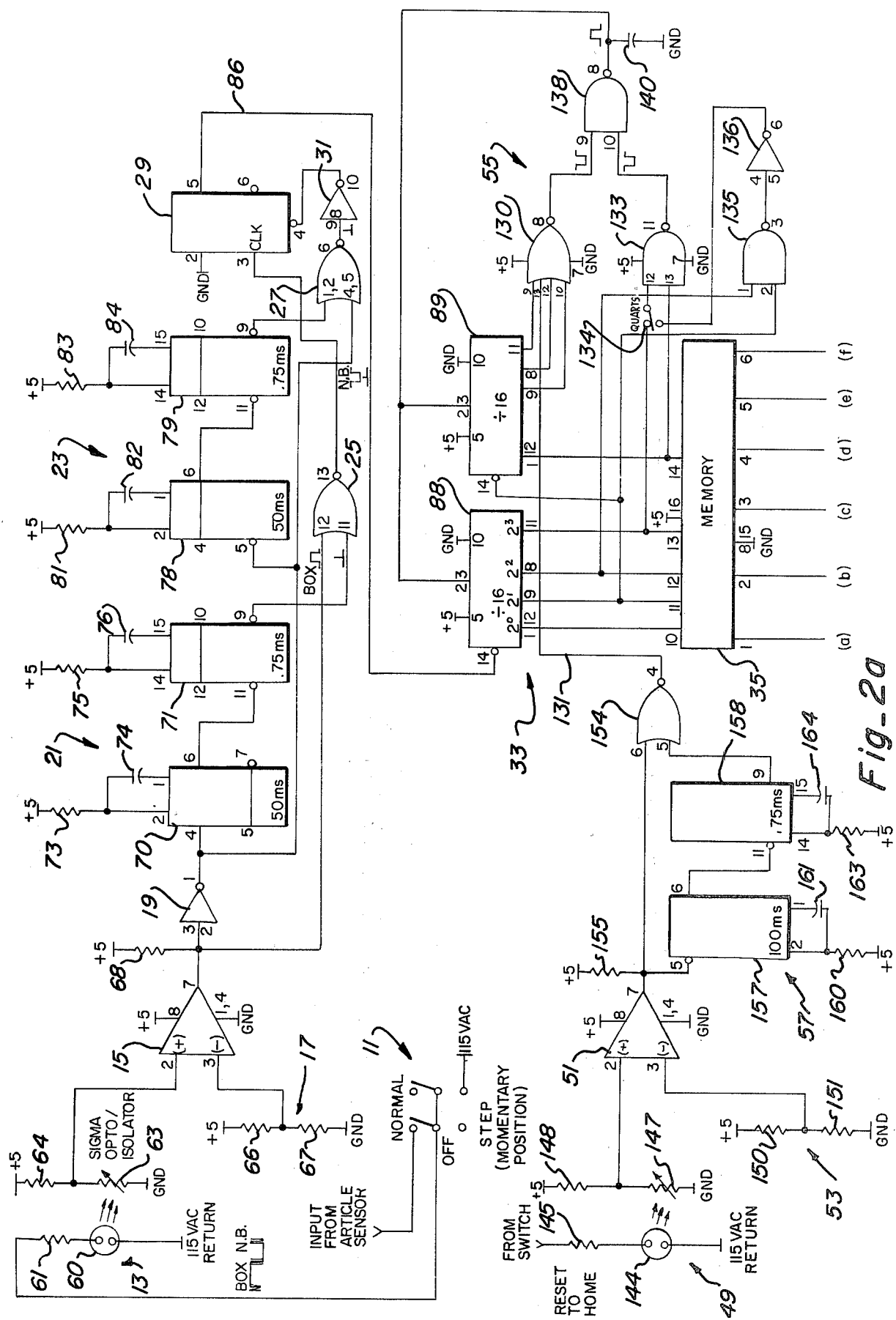
FIGS. 2a and b taken together constitute an electrical schematic and block diagram of the control system of this invention as shown in block form in FIG. 1.

Referring now to FIGS. 2a and b, a combined schematic and block diagram of the control system of this invention is shown. As shown, the input from article sensor 9 is coupled to switch 11, a three position switch (off, normal, and momentary step). In the normal position of switch 11, an electrical input signal indicative of a sensed article is coupled from article sensor 9 to opto-isolation circuitry 13 through switch 11. As indicated in FIG. 2, a positive pulse is indicative of a sensed article, while no pulse (or a negative pulse) is indicative of the absence of an article sensed by article sensor 9.

Opto-isolator circuitry 13 includes a photodiode 60 connected in series with resistor 61 between a 115 volt AC return and the article sensor circuitry. A light sensitive device 63 that varies in resistance in conventional fashion is positioned in the path of light from photodiode 60 and is connected in circuit in series with resistor 64 between a +5 volt power supply source (not shown) and ground. Optoisolator circuitry 13 is conventional and may be, for example, a Sigma Opto/Isolator.

The output from opto-isolator circuitry 13 is taken from the junction of light sensitive device 63 and resistor 64 and coupled to the positive input (pin 2) of comparator 15. The reference input to the comparator is coupled to the negative input (pin 3) from the junction of resistors 66 and 67 connected in series between the +5 volt power supply source (not shown) and ground.

The output from comparator 15 is coupled from pin 7 to inverter 19, with pin 7 also being connected to the +5 volt power supply through resistor 68. As also indicated in FIG. 2, the comparator output, indicative of the presence of a box, is also coupled to one input of NOR gate 25.

The output from inverter 19 is coupled to first and second detectors 21 and 23. First detector 21 includes a pair of one-shot, or monostable, multivibrators 70 and 71 with the output from inverter 19 being coupled to one input (pin 4) of one-shot multivibrator 70. One-shot multivibrators 70 and 71 are connected in cascade relationship, one output (pin 6) of multivibrator 70 being connected with an input (pin 11) of multivibrator 71. One-shot multivibrator 70 is a 50 millisecond multivibrator, while one-shot multivibrator 71 is a 0.75 millisecond multivibrator. Thus, when an output is coupled from inverter 19, multivibrators 70 and 71 produce a sharp spike, or trigger, output after 50 milliseconds that is coupled from an output (pin 9) of multivibrator 71 to the second input to NOR gate 25.

As shown in FIG. 2, one-shot multivibrator 70 has pin 2 connected with the +5 volt power source through resistor 73, while a capacitor 74 is connected between pin 1 of the multivibrator and resistor 73. In like manner, one-shot multivibrator 71 has pin 2 connected with the +5 volt power source through resistor 75, while capacitor 76 is connected between pin 1 of the multivibrator and resistor 75.

Second detector 23 also includes a pair of one-shot, or monostable, multivibrators 78 and 79 with the output from inverter 19 also being coupled to one input (pin 5) of one-shot multivibrator 78. One-shot multivibrators 78 and 79 are connected in cascade relationship with one output (pin 6) of multivibrator 78 being connected with an input (pin 11) of multivibrator 79. One-shot multivibrator 78 is also a 50 millisecond multivibrator, while one-shot multivibrator 79 is also a 0.75 millisecond multivibrator. Here again, when an input is coupled to one-shot multivibrator 78 from inverter 19, multivibrators 78 and 79 produce a sharp spike, or trigger, output after 50 milliseconds that is coupled from an output (pin 9) of multivibrator 79 to NOR gate 27. NOR gate 27 also receives an input from inverter 19 as indicated in FIG. 2.

As also shown in FIG. 2, one-shot multivibrator 78 has pin 2 connected with the +5 volt power supply through resistor 81, while a capacitor 82 is connected between pin 1 of the multivibrator and resistor 81. In like manner, one-shot multivibrator 79 has pin 2 connected with the +5 volt power supply through resistor 83, while a capacitor 84 is connected between pin 1 of the multivibrator and resistor 83.

The output from gate 25 is coupled to the clock input (pin 3) of flip-flop 29, while the output from gate 27 is coupled through inverter 31 to pin 4 of flip-flop 29. The output from flip-flop 29 is coupled to counter 33 on lead 86.

Counter 33 includes a pair of divide by sixteen ($\div 16$) counter units 88 and 89 with the output from flip-flop 29 being coupled on lead 86 to pin 14 of counter unit 88. Counter 33 is conventional and provides $2^0$ to $2^7$ outputs. As indicated in FIG. 2, outputs $2^0$, $2^1$, $2^2$, $2^3$, and $2^4$ are coupled to programable read-only memory unit 35.

A plurality of outputs (six as shown in FIG. 2) are coupled from memory circuit 35 to hex buffer unit 37. As shown, each lead from memory circuit 35 to buffer unit 37 has a resistor (resistors 91 to 96) connecting the lead with the +5 volt power supply.

The plurality of outputs (again six as shown in FIG. 2) from buffer unit 37 are coupled to opto-isolating drivers 39, shown in FIG. 2 to include six opto-isolator driver units 98 through 103. Each driver unit has pin 2 connected with the +5 volt power supply through resistors 105 to 110.

The outputs from driver units 98 to 103 are coupled through 3 amp fuses (112 to 117) to relays 43, shown in FIG. 2 as individual relays 120 to 125 each of which is connected at the other side to a 115 volt AC return. If desired, one or more of the devices could connect with drivers other than relays if desired to effect a desired end.

As indicated in FIG. 1, relays 43 are used to control specific palletizer functions such as, for example, a sweep to push boxes toward a pallet, box turning arms, and stops.

Counter 33 is caused to start the count upon receiving an input from flip-flop 29 on lead 86. This count is continued until the counter is automatically reset or until reset is externally initiated. As shown in FIG. 2, reset is automatically provided at a predetermined count through a plurality of leads from the counter connected with reset gates 55. The $2^5$, $2^6$, and $2^7$ outputs from counter unit 89 are coupled to NOR gate 130 as is a fourth input on lead 131 for manually initiated reset.

In addition, the $2^3$ and $2^4$ inputs from counter units 88 and 89, respectively, are coupled to NAND gate 133, and provision is made, if desired, by switch 134 to disconnect the $2^3$ output and substitute another input to gate 133, such as might be necessary, for boxes of different sizes (as, for example, quarts as indicated in FIG. 2). In this event, the $2^1$ and $2^2$ outputs from counter unit 88 are coupled to NAND gate 135, the output of which is coupled through inverter 136 and switch 134 to gate 133.

The outputs from gates 130 and 133 are coupled to NAND gate 138, the output of which is used for automatic reset and coupled back to counter units 88 and 89. The output of gate 138 also has a by-pass capacitor 140 to ground.

For manual reset, switch 47, connected to a 115 volt power source (not shown), is closed (a push-button switch, for example), and this energizes photodiode 144 of optoisolator unit 49 through resistor 145 in the unit. A light sensitive device 147 is positioned to vary in resistance when photodiode 144 is energized, and light sensitive device 147 is connected in series with resistor 148 between a +5 volt power source (not shown) and ground. Opto-isolator unit 49 is conventional and may be, for example, a Sigma Opto/Isolator.

The output from the opto-isolator unit 49 is coupled from the junction of light sensitive device 147 and resistor 148 and coupled to the negative input (pin 2) of capacitor 51. Capacitor 51 receives a reference voltage on the positive input (pin 3) from reference voltage source 53 which includes resistors 150 and 151 connected in series between the +5 volt power source and ground.

The output from comparator 51 is coupled to the reset gates 55, and more particularly, to NOR gate 154. In addition, the output (pin 7) of comparator 51 is connected with the +5 volt power source (through resistor 155) and to reset detector 57. Reset detector 57 includes a pair of one-shot multivibrators 157 and 158 with multivibrator 157 receiving the output from comparator 51 on pin 5. One-shot multivibrators 157 and 158 are connected in cascade relationship with the output (pin 6) from multivibrator 157 being connected to the input (pin 11) of multivibrator 158. The output (pin 9) of multivibrator 158 is connected to NOR gate 154 as the second input thereto. As indicated, one-shot multivibrator 157 is a 100 millisecond multivibrator while one-shot multivibrator 158 is a 0.75 millisecond multivibrator. In addition, pin 2 of multivibrator 157 is connected to the +5 volt power source through resistor 160 and pin 1 is connected to resistor 160 through capacitor 161. In like manner, pin 2 of multivibrator 158 is connected to the +5 volt power supply through resistor 163 and pin 1 is connected to resistor 163 through capacitor 164.

In operation where the control system is utilized to control the operation of a palletizer arranging a plurality of boxes in a predetermined configuration and orientation, a box is sensed by article sensor 9 and an electrical output indicative thereof is coupled to comparator 15 through the opto-isolator circuitry 13. Opto-isolator circuitry 13 provides isolation from the input and hence enhances system reliability.

At comparator 15, an output is produced when the input signal coupled through opto-isolator circuitry 13 exceeds a threshold established by reference voltage source 17. When this occurs, an output is provided by comparator 15 and coupled through inverter 19 to the detectors 21 and 23. Each of these detectors includes a pair of one-shot multivibrators connected in cascade with one another so that a sharp pulse, or spike, is produced at a predetermined time controlled by the timing of the one-shot multivibrators (50 milliseconds as indicated). If a box is sensed as still there, the output trigger from the first detector 21 is coupled to flip-flop 29 though gate 25. This causes pin 5 of flip-flop 29 to go low and this allows counter 33 to start a count. However, it is necessary that the second detector also provide an output to flip-flop 29 through gate 27 and inverter 31 or the flip-flop will produce no output (i.e. pin 5 will not go low) and the counter is precluded from starting a count. Hence, for a count to start, there must be successive pulses to the flip-flop from the first and second detectors or the counter will not be enabled. This also has proved to enhance system reliability.

After the counter starts to count, outputs are supplied to the programable memory 35 which causes each machine function to be carried out in a predetermined manner. For example, at one predetermined count, a relay is energized to cause an arm of the machine to push a box to a predetermined position, and/or turn the same, etc.

After a predetermined count (during which a predetermined number of boxes are handled), the counter is automatically reset through the reset gates and the system is now ready to start a new cycle, with as many cycles as desired being actually carried out. If it is desired to reset the counter system (as could occur, for example, if the machine jams), then switch 47 is closed, and this causes the control system to automatically reset.

The following components have been utilized in a working embodiment of the control system of this invention. The components listed are meant to be for illustrative purposes, however, and the invention is not meant to be limited thereto. These components are:

Resistors (Ohms): 61–33K; 64–4.7K; 66–10K; 67–10K; 68–1K; 73–150K; 75–47K; 81–150K; 83–47K; 91 to 96–2.7K; 105 to 110–47; 145–33K; 148–47K; 150–10K; 151–10K; 155–1K; 160–150K; and 163–47K.

Capacitors (MFD): 74–1; 76–0.05; 82–1; 84–0.05; 140–0.001; 161–2; and 164–0.05.

Comparators (Optional Amplifiers): 15 and 51–311.

Inverters (NOT Gates): 19–7402; 31–7402; and 136–7400.

NOR Gates: 25–7402; 27–7425; 130–7425N; and 154–7402.

AND-NOT Gates: 133–7400; 135–7400; and 138–7400.

One-shot Multivibrators: 70 and 71–½96L02; 78 and 79–½96L02; and 157 and 158–½96L02.

Bistable Multivibrator (flip-flop): 29–½74745.

÷ 16 Counter Units: 88 and 89–7493N.

Memory: 35–8223.

Buffer: 37–7417N.

Opto-isolator Drivers: 98 to 103–671-1.

From the foregoing, it can be seen that this invention provides an improved control system that is well suited for use with a palletizer.

What is claimed is:

1. A control system for use with a palletizing apparatus, comprising: article sensing means for producing a signal indicative of the sensed presence of an article; logic means connected with said article sensing means for verifying the presence of an article and producing a signal indicative thereof; counter means for counting in response to a signal received from said logic means; memory means for receiving said counter output and providing outputs at predetermined times; and driver means responsive to said outputs from said memory means for providing output signals for effecting predetermined palletizing functions.

2. The control system of claim 1 wherein said article sensing means includes opto-isolator circuitry for electrical signal isolation purposes.

3. The control system of claim 2 wherein said opto-isolator circuitry receives the output produced by the article sensor and isolates the same from the remainder of the circuitry of said control system.

4. The control system of claim 1 wherein said logic means includes first and second detectors connected with gates whereby the presence of an article is verified to enhance system reliability.

5. The control system of claim 4 wherein said logic means includes a comparator with said first and second detectors and receiving the output from said signal producing means, said logic means also including a flip-flop connected with said gates whereby said flip-flop is precluded from producing an output unless a predetermined output is received from both the said detectors through said gates.

6. The control system of claim 1 wherein said driver means includes opto-isolator circuitry for electrical isolation purposes.

7. The control system of claim 1 wherein said system is used with a palletizer, wherein said signal producing means produces a signal indicative of the sensed presence of an article to be handled by said palletizer, and wherein said driver means supplies output signals for effecting predetermined functions of said palletizer at predetermined times as determined by said memory means.

8. The control system of claim 1 wherein said system includes reset means for causing reset of said system upon demand.

9. The control system of claim 8 wherein said reset means includes opto-isolator means for electrical isolation purposes.

10. The control system of claim 9 wherein said reset means includes a switch connected with said opto-isolator means whereby said switch circuit is maintained electrically isolated from the remainder of said control system.

11. The control system of claim 8 wherein said reset means includes a reset detector connected with reset gates for effecting reset of said system.

12. A control system for use with a palletizing apparatus the control system connected to receive the output from an article sensor and providing output signals to effect predetermined machine functions, said control system comprising: an article sensor, first opto-isolator means connected to receive the output from said article sensor and providing an output indicative thereof that is electrically isolated from the circuitry of said article sensor; signal processing means including detector and logic means for verifying the presence of an article, a counter for counting when said article presence is verified, and programable memory means for providing outputs at predetermined times; and second opto-isolator means connected to receive said outputs from said signal processing means and produce therefrom output signals to effect said predetermined machine functions, said output signals from said output being electrically isolated from said signal processing means.

13. The control system of claim 12 wherein said system includes reset means having third opto-isolator means for electrical isolation purposes.

14. The control system of claim 12 wherein said control system is used with a palletizer handling a plurality of boxes to be positioned in a predetermined manner, wherein said article sensor senses the presence of said boxes, and wherein said predetermined machine functions are palletizer functions to effect said predetermined positioning of said boxes.

15. A control system for use with a palletizer, said system comprising: article sensing means for sensing articles to be handled by said palletizer and producing an output signal indicative thereof; first opto-isolator means connected to receive the output from said article sensing means and produce an output indicative thereof that is electrically isolated from said article sensing means output; comparator means for receiving the output from said first opto-isolator means and providing an output when said output from said first opto-isolator means exceeds a predetermined threshold value; a first inverter connected with said comparator means, first and second detector means connected with said comparator through said first inverter to receive the output therefrom; first gate means connected with said first detector means and said comparator; second gate means connected with said second connector means and said comparator through said first inverter; a second inverter connected with said second gate means; a flip-flop connected to receive the output from said first gate means and the output of said second gate means through said second inverter; a counter connected with said flip-flop; programable memory means connected with said counter and producing predetermined outputs at preselected times; and second opto-isolator means connected with said programable memory means and providing driver outputs for effecting predetermined palletizer functions, said driver outputs being electrically isolated from the remainder of said control system.

16. The control system of claim 15 wherein each of said first and second detectors includes a pair of one-shot multivibrators connected in cascade with one another.

17. The control system of claim 15 wherein said system includes reset means having switch circuitry, reset logic circuitry, and third opto-isolator means electrically isolating said switch circuitry from said reset logic circuitry.

18. The control system of claim 17 wherein said reset logic circuitry includes a comparator connected with said third opto-isolator means, reset gates, and a reset detector, said reset gates being connected with said counter for resetting the same upon closing of said switch circuitry.

19. The control system of claim 18 wherein said reset detector includes a pair of one-shot multivibrators connected in cascade with one another.

20. The control system of claim 15 wherein said palletizer includes a plurality of relays each of which is connected to receive a different one of said driver outputs from said third opto-isolator means for effecting said palletizer functions.

* * * * *